O. ROSSET, A. SCHWENK & V. KUTTER.
SAFETY SCREW JOINT.
APPLICATION FILED DEC. 19, 1910.

1,003,513.

Patented Sept. 19, 1911.

UNITED STATES PATENT OFFICE.

OTTO ROSSET AND ANTON SCHWENK, OF FREIBURG, AND VIKTOR KUTTER, OF WIESBADEN, GERMANY.

SAFETY SCREW-JOINT.

1,003,513.      Specification of Letters Patent.      Patented Sept. 19, 1911.

Application filed December 19, 1910. Serial No. 598,147.

*To all whom it may concern:*

Be it known that we, OTTO ROSSET, merchant, and ANTON SCHWENK, lawyer, subjects of the Grand Duke of Baden, and residents of Freiburg i. Br., and VIKTOR KUTTER, a subject of the Grand Duke of Baden, and a resident of Wiesbaden, Germany, have invented a new and useful Improvement in Safety Screw-Joints, of which the following is a full and clear specification, reference being had to the accompanying drawing, forming a part of this invention.

Our invention consists of a safety-screw-joint, in which at least four parts, inclusive of the bolt, are so employed, that two of them are connected together in a special manner and are screwed together with the other parts.

Safety-screw-joints comprising one bolt having two opposite screw-threads and two nuts with opposite threads are already known. With such safety-screw-joints, however, the entry of the second nut depends upon the chance, that all the screw-threads are brought into the corresponding position in relation to one another, which almost invariably is rendered possible only by first loosening the first nut, whereby of course the purpose of a screw-joint, viz. the most effective fastening possible of an object, is obtained only with great difficulty. This defect is removed by our invention in the manner, that one of the screw-threads is disposed on a longitudinally movable part.

We will now proceed to describe our invention with reference to the accompanying drawing, in which—

Figure 1:
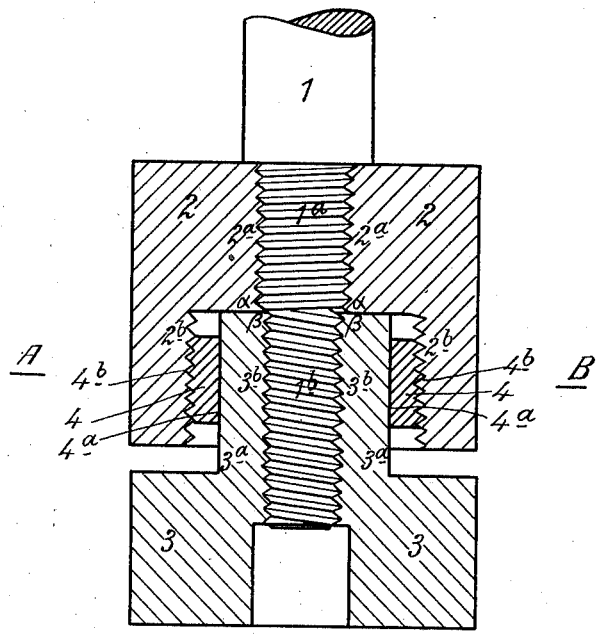
Figure 2:
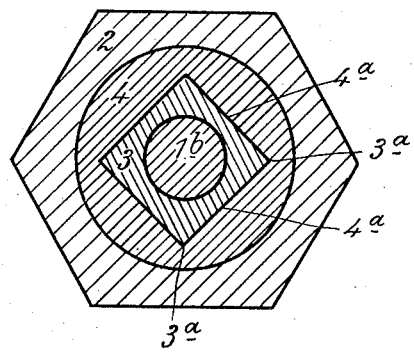

Figure 1 is a longitudinal central section through the safety-screw-joint in one mode of execution, and Fig. 2 is a cross section through the same on the line A—B in Fig. 1.

The bolt 1 is provided with two opposite screw-threads $1^a$ and $1^b$ of different diameters. A first nut 2 is made to engage with its internal thread $2^a$ in the external thread $1^a$ of the bolt. The nut 2 has a depending flange inclosing a central recess, the recess extending from the lower end face to about the middle of the nut. On the inside of this recess the nut 2 is provided with an internal screw-thread $2^b$ opposite to its screw-thread $2^a$, the screw-thread $2^b$ facing the other screw-thread $1^b$ of the bolt and having the same direction as this thread.

A second nut 3 having a central projection or sleeve $3^a$ of smaller diameter than the recess in the nut 2 is made to engage with its projection $3^a$ in the said recess and with its internal thread $2^b$ in the external thread $b'$ of the bolt 1. A third nut 4 is located in the annular space between the depending flange of nut 2 and the sleeve $3^a$ of nut 3, said third nut being provided with an external thread $4^b$ which engages the internal thread $2^b$ of the nut 2. The part 4 is in any known manner so fitted to the outside of the projection $3^a$ as to longitudinally move on the same while it is prevented from turning, for example the projection $3^a$ is shown in Fig. 2 to be square on the outside 1 so that the part 4 is provided with a square hole, the walls $4^a$ of which come in contact with the projection $3^a$.

Where so preferred, the projection $3^a$ may be made oval in cross section, in which case the part 4 is provided with an oval hole. Or the projection $3^a$ may be made cylindrical on its outside and the part 4 may have a cylindrical hole, while the two parts may be prevented from turning in relation to one another, say by means of a feather or a pin in one part and of a longitudinal groove in the other part.

Owing to the construction described of the safety-screw-joint the first nut 2 can be at once screwed tightly on the bolt 1, after which the second nut 3 can be screwed on the thread $1^b$ of the bolt, the part 4 having been previously put on the projection $3^a$. When the nut 3 has been screwed on the bolt 1 through some distance, the part 4 can be shifted forward and as it partakes in the rotation of the nut 3, it will easily engage in the turns of the internal thread $2^b$. During the screwing of the second nut 3 on the screw-thread $1^b$ of the bolt 1 the part 4 will also proceed in the same direction in the thread $2^b$ of the first nut 2 and the two parts 3 and 4 can be screwed in with the same ease and without encountering any obstacle, until the end face $\beta$ of the nut 3 strikes and bears against the end face $a$ of the nut 2.

It will be seen, that when one of two parts having each two opposite screw-threads is connected with a further part, the latter receives one of the opposite threads.

In the manner described the several parts of the safety-screw-joint can be easily handled and any inadvertent loosening of the joint is excluded, while the intended loosening of the joint can be effected at any time easily without damaging the several parts.

We claim—

1. A screw joint comprising a first member having a right hand thread, a second member having a left hand thread, and a third member having a right hand and a left hand thread section adapted to be engaged by the first and second members respectively, one of said members being composed of two sections axially movable relatively to each other.

2. A screw joint comprising a spindle having a pair of oppositely threaded sections, a first nut having a first threaded section that engages the first spindle-section and a second threaded section the thread of which extends in the same direction as that of the second spindle-section, a second nut engageing said second spindle section, and a third nut slidable on the second nut and engaging the second threaded section of the first nut.

3. A screw joint comprising a spindle having a pair of oppositely threaded sections, a first nut having a first threaded section that engages the first spindle-section and a recess having a thread which extends in the same direction as that of the second spindle thread, a second nut having a sleeve that engages the second spindle thread and is accommodated within the recessed section of the first nut, and a third nut slidable upon the sleeve and engaging the thread of said recessed section.

In witness whereof we have hereunto signed our names in the presence of two subscribing witnesses.

OTTO ROSSET.
ANTON SCHWENK.
VIKTOR KUTTER.

Witnesses:
AUGUST OOSTERMAN,
MARIA HEITTIG.

Copies of this patent may be obtained for five cents each, by addressing the "Commissioner of Patents, Washington, D. C."